United States Patent
Kahn et al.

(10) Patent No.: US 8,484,671 B1
(45) Date of Patent: Jul. 9, 2013

(54) RECEIVER INTERFACE WITH MULTIPLE ACCESS CARDS

(75) Inventors: Raynold M. Kahn, Los Angeles, CA (US); Philip I. Siegel, Fountain Valley, CA (US); Daryl G. Messenger, Inglewood, CA (US); Dennis R. Flaharty, Irvine, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 3604 days.

(21) Appl. No.: 10/680,862

(22) Filed: Oct. 7, 2003

(51) Int. Cl.
*H04N 7/16* (2006.01)

(52) U.S. Cl.
USPC .................. 725/25; 725/27; 725/28; 725/29; 725/30; 725/31

(58) Field of Classification Search
USPC ............................................... 725/25, 27–31
See application file for complete search history.

(56) References Cited

U.S. PATENT DOCUMENTS

| | | | |
|---|---|---|---|
| 4,170,348 A | 10/1979 | Hoeink et al. |
| 4,412,631 A | 11/1983 | Haker |
| 4,648,064 A | 3/1987 | Morley |
| 4,667,959 A | 5/1987 | Pfeiffer et al. |
| 4,701,601 A | 10/1987 | Francini et al. |
| 4,800,551 A | 1/1989 | Norris |
| 4,806,744 A | 2/1989 | Briane et al. |
| 4,936,790 A | 6/1990 | De La Cruz |
| 4,952,161 A | 8/1990 | Komatsu |
| 5,036,537 A | 7/1991 | Jeffers et al. |
| 5,059,774 A | 10/1991 | Kubo et al. |
| 5,107,099 A | 4/1992 | Smith |
| 5,210,855 A | 5/1993 | Bartol |
| 5,251,782 A | 10/1993 | Crosby et al. |
| 5,286,962 A | 2/1994 | Fujioka et al. |
| 5,287,269 A | 2/1994 | Dorrough et al. |
| 5,307,338 A | 4/1994 | Suzuki et al. |
| 5,310,998 A | 5/1994 | Okuno |
| 5,324,204 A | 6/1994 | Lwee |
| 5,325,431 A | 6/1994 | Naruse |
| 5,382,781 A | 1/1995 | Inoue |
| 5,386,567 A | 1/1995 | Lien et al. |
| 5,490,792 A | 2/1996 | Sugita |
| 5,526,344 A | 6/1996 | Diaz et al. |
| 5,561,628 A | 10/1996 | Terada et al. |
| 5,617,081 A | 4/1997 | Madnick et al. |

(Continued)

FOREIGN PATENT DOCUMENTS

EP 0562295 A1 * 9/1993
EP 0 992 953 4/2000

(Continued)

*Primary Examiner* — Jeremy Duffield

(57) ABSTRACT

A device and method for multiple access cards to interface to at least one integrated receiver/decoder (IRD) and methods for using the device. The interface device of the present invention contains multiple access card readers and houses multiple access cards. The device can switch between access cards based on pre-configured software that rotates the cards according to various conditions. In another embodiment, the device can simultaneously operate all the cards. The device can select one card for the IRD based on responses acquired for the various conditions. In addition, the present invention allows monitoring access card authorizations and blackout states in multiple IRDs. A single access card can be applied to more than one IRD simultaneously, and the IRDs can be different versions. In addition, the present invention provides a satellite broadcast center with the capability of testing multiple access cards in real time either sequentially, or in parallel, through multiple IRDs.

9 Claims, 1 Drawing Sheet

U.S. PATENT DOCUMENTS

| | | | |
|---|---|---|---|
| 5,634,805 A | 6/1997 | Saito et al. | |
| 5,644,731 A | 7/1997 | Liecres et al. | |
| 5,666,293 A | 9/1997 | Metz et al. | |
| 5,666,412 A * | 9/1997 | Handelman et al. | 380/229 |
| 5,679,007 A * | 10/1997 | Potdevin et al. | 439/76.1 |
| 5,748,732 A * | 5/1998 | Le Berre et al. | 725/31 |
| 5,748,737 A | 5/1998 | Daggar | |
| 5,752,757 A | 5/1998 | Choi | |
| 5,774,546 A | 6/1998 | Handelman et al. | |
| 5,900,867 A | 5/1999 | Schindler et al. | |
| 5,901,049 A | 5/1999 | Schmidt et al. | |
| 5,912,453 A | 6/1999 | Gungi et al. | |
| 5,913,013 A | 6/1999 | Abecassis | |
| 5,915,020 A | 6/1999 | Tilford et al. | |
| 5,936,226 A | 8/1999 | Aucsmith | |
| 5,940,737 A | 8/1999 | Eastman | |
| 5,945,652 A | 8/1999 | Ohki et al. | |
| 5,963,916 A | 10/1999 | Kaplan | |
| 5,987,438 A | 11/1999 | Nakano et al. | |
| 6,003,134 A | 12/1999 | Kuo et al. | |
| 6,021,948 A | 2/2000 | Tsai et al. | |
| 6,035,037 A * | 3/2000 | Chaney | 380/227 |
| 6,038,551 A | 3/2000 | Barlow et al. | |
| 6,041,375 A | 3/2000 | Bass et al. | |
| 6,141,711 A | 10/2000 | Shah et al. | |
| 6,155,433 A | 12/2000 | Anderson et al. | |
| 6,189,786 B1 | 2/2001 | Itou et al. | |
| 6,200,166 B1 | 3/2001 | King | |
| 6,250,557 B1 | 6/2001 | Forslund et al. | |
| 6,250,965 B1 | 6/2001 | Neifer | |
| 6,260,111 B1 | 7/2001 | Craig et al. | |
| 6,340,117 B1 | 1/2002 | Eisele et al. | |
| 6,356,549 B1 | 3/2002 | Hori | |
| 6,359,699 B1 | 3/2002 | Yoneta et al. | |
| 6,360,952 B1 | 3/2002 | Kimlinger et al. | |
| 6,402,029 B1 | 6/2002 | Gangi | |
| 6,434,034 B1 | 8/2002 | Wallace et al. | |
| 6,438,638 B1 | 8/2002 | Jones et al. | |
| 6,874,683 B2 * | 4/2005 | Keronen et al. | 235/380 |
| 7,120,253 B2 * | 10/2006 | Ducharme et al. | 725/31 |
| 2001/0004769 A1 | 6/2001 | Simon | |
| 2001/0027560 A1 | 10/2001 | Simon | |
| 2001/0032312 A1 | 10/2001 | Runje et al. | |
| 2001/0041053 A1 | 11/2001 | Abecassis | |
| 2001/0054647 A1 | 12/2001 | Keronen et al. | |
| 2002/0012347 A1 | 1/2002 | Fitzpatrick | |
| 2002/0017558 A1 | 2/2002 | Graves | |
| 2002/0020745 A1 | 2/2002 | Yap et al. | |
| 2002/0108122 A1 | 8/2002 | Alao et al. | |
| 2003/0212895 A1 * | 11/2003 | Kisliakov | 713/185 |

FOREIGN PATENT DOCUMENTS

| | | |
|---|---|---|
| EP | 1 024 661 | 8/2000 |
| EP | 1 028 551 | 8/2000 |
| EP | 1 148 438 | 10/2001 |
| EP | 1 209 908 | 5/2002 |
| WO | WO 98/49658 | 11/1998 |
| WO | WO 98/52158 | 11/1998 |
| WO | WO 99/39312 | 8/1999 |
| WO | WO 00/07154 | 2/2000 |
| WO | WO 0059210 A1 * | 10/2000 |
| WO | WO 00/68797 | 11/2000 |
| WO | WO 01/08113 | 2/2001 |
| WO | WO 01/41032 | 6/2001 |
| WO | WO 01/76251 | 10/2001 |
| WO | WO 01/80190 | 10/2001 |
| WO | WO 02/25847 | 3/2002 |
| WO | WO 0225847 A1 * | 3/2002 |
| WO | WO 02/054335 | 7/2002 |
| WO | WO 02/056574 | 7/2002 |

* cited by examiner

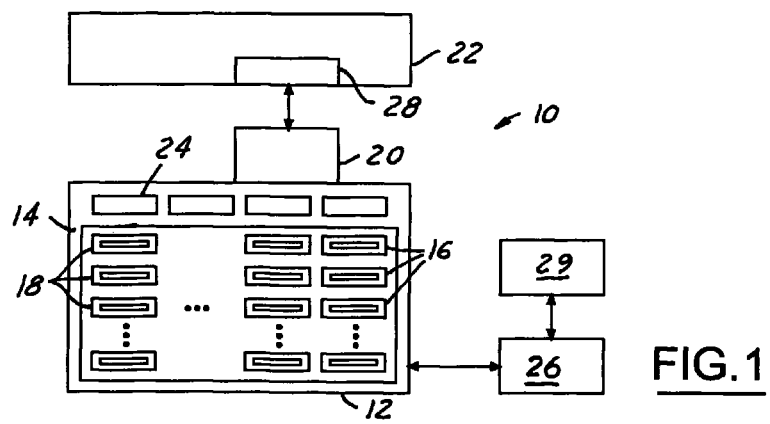
FIG.1
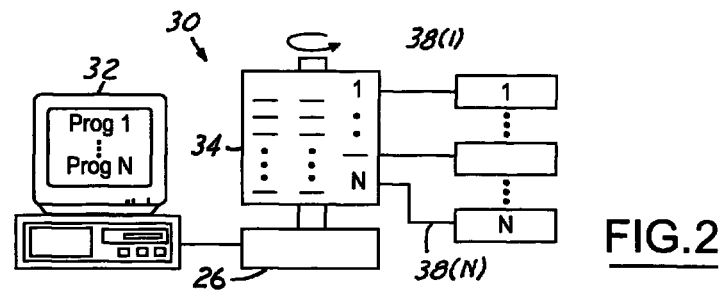
FIG.2
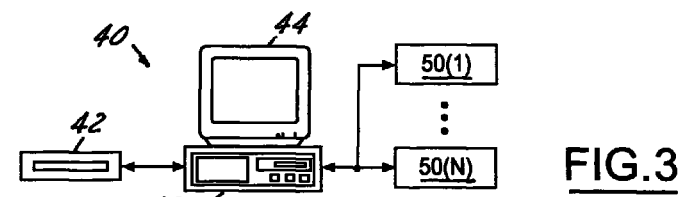
FIG.3
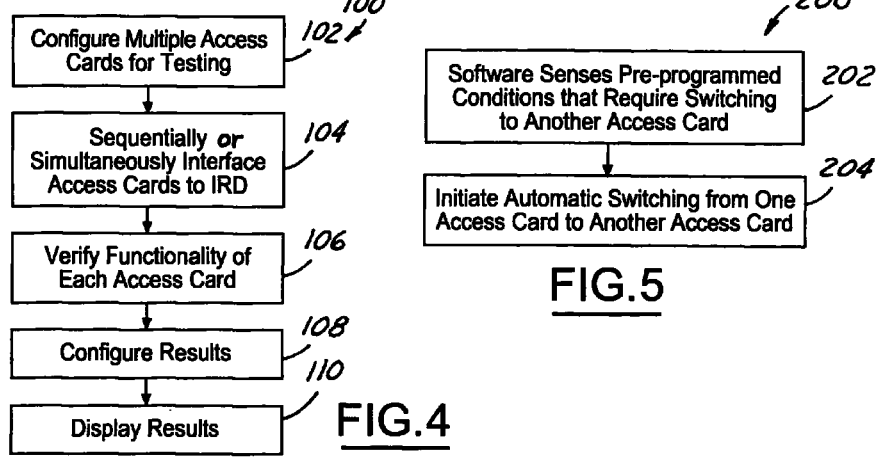
FIG.4
FIG.5

RECEIVER INTERFACE WITH MULTIPLE ACCESS CARDS

TECHNICAL FIELD

The present invention relates generally to a satellite receiver and more particularly to a device and method for access to multiple access cards interfaced with a satellite receiver.

BACKGROUND OF THE INVENTION

Digital communications systems that broadcast by satellite transmit signals for reception by antennas at individual customer locations. These antennas receive the satellite signals and send them to an integrated receiver/decoder that is typically located at the customer's television set. It is known to provide an access card having programmable capabilities that is inserted in the receiver. The programmed information contained on the access card includes information that allows a customer to access programming. The access card also prevents customer access to certain programming events based on information communicated to the receiver/decoder.

Currently, the receiver accepts and reads only one access card at a time. Therefore, the current access card must be extracted before it can be replaced with another. This replacement process interrupts the audio and video programming for several seconds while the access card is being exchanged and the new access card passes the security protocol with the receiver.

In another application, broadcast providers monitor access card authorization and blackout states in multiple integrated receiver/decoders located throughout a service area. This particular application requires the restriction of certain programming based on location, often implemented by zip codes. It also requires the testing of software codes through a single access card to interface with multiple integrated receiver/decoders, before those software codes are implemented on a large scale. However, it is difficult for the broadcaster to monitor access card authorizations when there are several different versions of integrated receiver/decoders in use in a service area. A device that allows a single access card to communicate with several different versions of receivers could provide some relief.

There is a need for alternating the use of access cards in a satellite receiver without having to physically remove the access card currently inserted in the receiver and insert a replacement access card. This capability not only enhances testing and monitoring, but it also provides improved customer satisfaction in that it prevents an interruption of the audio and video viewing.

SUMMARY OF THE INVENTION

The present invention is an interface device that allows multiple access cards to interface to a receiver and methods for using the device. The interface device of the present invention contains multiple access card readers and houses multiple access cards. The device can switch between access cards based on pre-configured software that rotates the cards according to various conditions. In another embodiment, the device can simultaneously operate all the cards. The device can select one card for the receiver based on responses acquired for the various conditions.

In addition, the present invention allows monitoring access card authorizations and blackout states in multiple integrated receiver decoders. A single access card can interface to more than one receiver, though not simultaneously. The receivers can be different versions. In addition, the present invention provides a satellite broadcast center with the capability of testing multiple access cards in real time either sequentially, or in parallel, through multiple receivers.

In one embodiment, the device of the present invention houses multiple access cards in a rack whereby the cards are interfaced to the receiver by way of an interface device that electronically switches between the access cards. A movable tongue moves in a back-and-forth motion, each time tripping a card insertion sensor in the receiver card slot and interfacing with a card reader. The interface device houses multiple card readers thereby providing uninterrupted service during the switching of access cards. The interface is accomplished completely through software control and the tongue insert. The access card remains within the interface device and is not physically inserted or removed from the receiver/decoder. Having multiple card readers allows the device to maintain communication with the existing access card and interface with the replacement access card by way of software. Therefore, the security protocol can be applied to the replacement card before switching to the new access card from the existing access card.

It is an object of the present invention to interface multiple access cards to an integrated receiver/decoder. It is another object of the present invention to prevent interruption of audio and video programming during switching of access cards in a single receiver/decoder. It is still another object of the present invention to operate a single access card with multiple receiver/decoders simultaneously.

It is a further object of the present invention to provide software interface for the multiple access card interface thereby providing automatic switching between access cards. Still a further object of the present invention is to provide a method of monitoring and testing multiple access cards for either a single integrated receiver/decoder or for multiple integrated receiver/decoders simultaneously. Yet a further object of the present invention is to test multiple monitoring software programs before communicating with the actual integrated receiver decoder.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings:

FIG. 1 is a diagram of the interface device of the present invention;

FIG. 2 is a block diagram of the method for alternating cards in an integrated receiver/decoder;

FIG. 3 is a block diagram of the method of conditionally selecting one of several access cards;

FIG. 4 is a block diagram of the method of testing software programs using the device of the present invention; and FIG. 5 is a block diagram of the method of simultaneously monitoring more than one integrated receiver/decoder.

DETAILED DESCRIPTION OF PREFERRED EMBODIMENTS

The present invention is an interface device, and method for using the same, that allows multiple access cards to be interfaced with at least one integrated receiver/decoder (IRD). FIG. 1 is a diagram of the interface device 10 of the present invention. While a rack-type card reader device is shown, one skilled in the art is capable of designing many different physical configurations for the device without departing from the scope of the claims hereinafter. For example, instead of a rack, the card holder could be in the form of a carousel, or other device that houses multiple cards that are accessed electronically, either individually or simultaneously as shown in FIG. 2.

The present invention is a device that automates the insertion and removal of multiple access cards in the IRD. In accordance with the present invention, the access cards may be physically removed and re-inserted in an IRD, or alternatively, may not be. The switching between access cards is accomplished by way of software interface for the embodiment wherein the access card is not removed from the IRD. Referring to FIG. 1, the device 10 has a housing 12 containing a rack member 14 having several slots 16. Each slot 16 holds an access card 18 and each access card 18 is in communication with a single moveable tongue 20. The movable tongue interfaces between the device 10 of the present invention and at least one IRD 22.

The device 10 has at least one card reader 24. In the embodiment shown in FIG. 1, the device 10 has a plurality of card readers 24 allowing individual or simultaneous operation of multiple access cards. A processor 26 is programmed with software that changes the interface between the movable tongue 20 and one access card 18 to another access card 18 based on various predetermined conditions. When the processor 26 senses, through software interface, that predetermined conditions have been met, the processor 26 directs the interface device 10 to automatically simulate the removal of the existing access card and the insertion of another access card into the receiver. In one embodiment the removal and insertion are accomplished by electrical interface between the movable tongue 20 and the desired card slots 16 and the physical access card is not moved in any way. In another embodiment, the movable tongue 20 slides in and out of the card reader 28 as the various IRD's are cycled by.

In a comparison to the prior art, the IRD 22 has a card reader 28 that would normally house one access card. However, according to the present invention, the movable tongue 20 acts to interface with the IRD 22 and appears to be an access card to the card reader 28 in the IRD. This allows the software to interface any one or more of the access cards 18 in the device 10 with the IRD 22 without physically having to insert or remove the access card from the card reader 28 on the IRD 22. In the event the IRD 22 requires physical insertion and/or removal of the access card to reboot the IRD 22, the movable tongue can by physically removed and inserted to simulate the removal and insertion of an actual access card.

In testing applications it is sometimes necessary to cycle the power to the receiver. According to the present invention, a digitally controlled power interruption switch 23 can be controlled by the software program to turn on and off the power to the IRD 22. The digital controller 26 may have a display 29 that allows a user, or testing operator, to adjust the interface and select access cards as desired, or by software control.

The predetermined conditions used by the processor are set by the user, or broadcast provider. Some examples of predetermined conditions may include, but are not limited to, conditional access, decryption capabilities, calendar date and time of day to name just a few. There are several aspects related to conditional access program viewing that are too numerous to mention herein, but may be useful in testing access cards, receivers and the like. One skilled in the art is capable of determining useful predetermined conditions that are relevant to the specific application for the device of the present invention.

There are several advantages to the device 10 of the present invention. For example, in applications and locations where multiple access cards must be alternately removed and re-inserted into a given IRD, the present invention allows the simulation of removal and re-insertion of the card, effectively switching the cards electronically by way of software control. In situations where the actual physical act of removing and inserting the card is necessary, the tongue 20 is movable and can be removed and reinserted with the data from the newly selected access card. In addition, using a movable rack or carousel allows the same access card to physically be inserted alternately into a variety of IRDs.

Because the interface device has a processor 26 that is programmable, it is possible to compile data and send it to a printer, or to a display device 29, such as a monitor to display access card status, test results, and responses from each access card being housed in the device. The display 29 allows a user to view test inputs, data, and results without the need to print out a report, unless it is desired to do so.

Referring now to FIG. 2, another embodiment 30 of the present invention is shown. A personal computer 32 stores multiple software emulation packages, PROG 1 through PROG N, that represent individual access cards. The software emulation packages are loaded through multiple movable tongues 38(1) through 38(N) on a spindle device 34 that interfaces with multiple IRD's 36. The programs PROG 1 through PROG N that are communicated to the spindle device 34 have access cards 1 through N that correspond to the programs. The receivers 1 through N are interfaced to the spindle device 34 and their respective access cards 1 through N by individual tongues 38(1) through 38(N).

In yet another embodiment 40, shown in FIG. 3, a single reprogrammable access card 42 in a card reader 46 is electronically interconnected to a personal computer 44 having a stored database of multiple emulator programs 48. The single card 42 can be driven sequentially by the emulator programs 48. In this embodiment the software gives the IRD 50(1) the impression that it has been turned off and on in order to sequence through the emulator programs.

This embodiment is particularly useful in development and testing of IRD's. For example, it is possible to ascertain if a particular emulator program will drive a particular IRD 50(1). In order to secure programming or data services, the program switches through the many stored emulator programs until a picture is achieved through the IRD. In another embodiment, a laboratory test technician is able to test multiple IRD's 50(1) through 50(N) driven by multiple cards receiving downloaded emulator programs from the stored database in the personal computer. It is also possible to include a response from the IRD's 50(1) through 50(N) to the computer 44 in conjunction with the emulator program to provide test results to a technician on the quality of the signal received by the IRD.

In another embodiment of the present invention, the emulator programs 48 are used in a monitoring facility. In a satellite broadcast center, a monitor wall containing a plurality of monitors is used to constantly monitor the images of the broadcasts. According to the present invention, should a full access, or unrestricted, monitoring card ever fail in use or be stolen, it can be reprogrammed, through software, to reconfigure the monitoring card without interrupting the displayed images at the broadcast center. The present invention can also provide an electronic lock by requiring the sequential application of various emulator software until access through the IRD is achieved. According to this embodiment of the present invention, loading multiple emulation software packages into the computer becomes the equivalent of a series of mechanically, or electro-mechanically, interconnected stacked, programmed conditional access cards.

The present invention is capable of providing emulator software to drive multiple IRD's for system monitoring. This aspect of the invention does not require a full access monitoring card. Instead, the present invention creates a firewall protecting the IRD's from access without permission by emulating an individual access card for each IRD. The process of switching from receiver to receiver through the multiple emulator database avoids completely the advantage of stealing such an engineering card by removing the need for the card completely. Without the actual card to steal, there is no motive to steal the card. The emulation computer supports multiple IRD's and emulates the monitoring card functions. The computer 44 and/or programmable access card 42 can be stored in a secure facility or enclosure that is physically separate from the less secure monitoring facility.

The present invention provides many useful applications for testing and monitoring software function testing, access card testing and IRD testing. These will be discussed in detail using the flow chart method diagrams of FIGS. 4 and 5.

FIG. 4 is a method for testing the access card in a particular receiver. Currently in the art, a single receiver may accept multiple access cards. However, only one card is interfaced to the receiver at a time. The method of the present invention simulates the removal and re-insertion of sequential access cards into the same receiver in order to verify the functionality of each of the access cards in that particular receiver.

According to one embodiment of the method 100 of the present invention, the access cards are configured 102 for testing and each card is sequentially interfaced 104 with the receiver. The test rack and interface can be the spindle, or rack device that holds multiple access cards. In addition, the test rack and interface can be with a single programmable access card that is accessed by the receiver through a personal computer, or other controller device, having several access programs stored thereon. In any event, the actual interface between the IRD and the access card is strictly controlled by software and there is no physical exchange of access cards in the IRD.

The sequential interface 104 of the access cards to the IRD simulates the removal and insertion of access cards into the same receiver. The functionality of each access card can be verified 106. The results of the test, which include the responses of the IRD from the different cards, are compiled 108 by the controller and presented 110 in a hard copy, on a monitor, or both.

In another aspect of testing, the step of verifying the functionality of the access card includes the need to power the IRD on and off resulting in a "hard reboot". The present invention avoids the manual removal and re-insertion associated with a hard reboot and provides automated power cycling of the IRD for applications where this is necessary. The present invention allows rapid verification of multiple access cards without manually having to remove and reinsert the cards into the IRD, or to power cycle the receiver.

Another application of the present invention is to use the present invention for monitoring access card authorizations and blackout states. Currently, some programming events, such as sporting events, are required to be blacked out to some viewers. The black outs are generally accomplished by zip codes, which are set on the access cards. In order to monitor that the black outs have been correctly programmed, a variety of access cards having the applicable zip codes must be cycled through the receivers to ensure that the black outs are applied correctly. Configuring a test rack of access cards that require black out verification according to the present invention eliminates the need to verify black outs by manually removing and reinserting cards into a receiver.

In another application, the present invention is used to switch from one access card to another during periods of access card changeover. Access card changeover requires the transfer of information stored on the original card to a replacement card. In the prior art, this changeover required removing the original card, replacing it with a new card, reinserting the original card to identify what needs to be copied, and then reinserting the new card for copying information from the original card to the new card. However, with the present invention it is no longer necessary to remove and replace cards. With the applicable software interface, the desired information can be copied from the original card to the new card without having to extract the original card.

As it has become clear from the preceding discussion, the present invention enables faster verification and testing of access cards and receivers in a lab environment. Referring now to FIG. 5, a method 200 is shown for interfacing multiple access cards with a single IRD.

Pre-configured software causes the device of the present invention to rotate from one card to another based on predetermined conditions. The software senses 202 pre-programmed conditions that require the receiver to switch from one access card to another. The software initiates the device of the present invention to automatically switch 204 from one access card interface to another access card interface upon the predetermined conditions being met.

In a conditional access testing application, the pre-programmed conditions include detecting a control word that is not decrypted properly. Upon detection, the software automatically switches 204 to the next access card in the device, or the next access card program in the computer, until one is found that is able to decrypt the control word. Alternatively, the process is not sequential, but the access cards are all checked simultaneously, and the appropriate card is selected from the group of access cards, or information is copied from one access card to a replacement access card. Once the proper card, or software emulation, has been detected, the IRD will pass the approved card, or program, from the receiver to a display, such as a television.

In summary, the present invention automates the process of removing and inserting access cards either without the manual act of physically removing and inserting the card, or by automating the physical removal and reinsertion process. Multiple cards housed in a mechanical rack interface with an IRD through an interface device that electrically switches between access cards while a movable tongue interface trips the access card insertion sensor in the receiver card slot. In another embodiment, the interface of multiple cards to the receiver includes software operable to rotate between cards based upon pre-programmed conditions. When the software senses certain conditions that are pre-programmed into the cards, it will initiate the device to switch to electronic connection with the card having those conditions. In this case, because the connections are electronic and not physical, the present invention provides uninterrupted service. Further, both of these embodiments are directed to a device having a rack type storage system for multiple access cards. Each card has its distinct software and the switching between cards is driven by software. Alternatively, the racks may rotate or otherwise move to physically insert the access cards into multiple receivers, or insert multiple access cards sequentially in the same receiver.

The invention covers all alternatives, modifications, and equivalents, as may be included within the spirit and scope of the appended claims.

What is claimed is:

1. A system for interfacing at least one access card with at least one integrated receiver decoder, said system comprising:
    a housing;
    at least one card reader in the housing;
    an electrical interface in the housing, the electrical interface being between the at least one card reader and the at least one integrated receiver decoder;
    a plurality of slots for holding a plurality of access cards, each of the plurality of slots in selective electrical communication with said at least one card reader through an electrical interface;
    a processor for controlling a selection of only one of the plurality of access cards to provide information to the at least one integrated receiver decoder to allow access to programming, wherein said processor further comprises predetermined access conditions programmed therein that determine the selection of an access card, whereby upon the predetermined access conditions being met by the one of the plurality of access cards, the removal of an existing access card from the integrated receiver decoder and the insertion of another access card into the integrated receiver decoder is automatically simulated.

2. The system as claimed in claim 1 wherein the electrical interface is a tongue member that is inserted in the at least one integrated receiver decoder, the tongue member being movable between the housing and the at least one integrated receiver decoder.

3. The system as claimed in claim 1 wherein said plurality of slots comprises a rack member for holding the at least one access card.

4. The system as claimed in claim 1 wherein said plurality of slots comprises a carousel member for holding the at least one access card.

5. The system as claimed in claim 1 wherein said predetermined access conditions are set by a broadcast provider.

6. The system as claimed in claim 1 further comprising a display interfaced to the processor.

7. The system as claimed in claim 6 wherein the display further comprises an operator interface for inputting parameters to the processor, whereby the parameters affect the predetermined access conditions.

8. The system as claimed in claim 1 further comprising a personal computer interfaced with the processor.

9. A method for interfacing more than one access card to a plurality of integrated receiver/decoders, each having a card reader comprising the steps of:
    simultaneously interfacing with a plurality of access cards with an interface device to sense predetermined conditions that determine the selection of an access card from a plurality of access cards;
    directing the interface device to simulate the insertion of the selected access card to the at least one integrated receiver/decoder;
    electrically interfacing the selected access card to a card reader in the at least one integrated receiver/decoder; and
    sliding a tongue of the interface device in and out of the card reader of each integrated receiver/decoder as a plurality of integrated receiver/decoders are cycled by to sense predetermined conditions that determine the selection of an access card, thereby interfacing more than one access card to more than one integrated receiver/decoders.

* * * * *